United States Patent
Connolly

[15] 3,664,923
[45] May 23, 1972

[54] FAST NEUTRONIC REACTOR UTILIZING PLUTONIUM 240 FUEL

[72] Inventor: Thomas J. Connolly, 855 Lathrop Drive, Stanford, Calif. 94305

[22] Filed: Sept. 11, 1968

[21] Appl. No.: 758,974

[52] U.S. Cl................................176/40, 171/18, 171/89
[51] Int. Cl...........................................G21c 1/02
[58] Field of Search..................176/40, 89, 16, 18

[56] References Cited

UNITED STATES PATENTS

| | | | |
|---|---|---|---|
| 3,041,263 | 6/1962 | Kiehn et al. | 176/18 |
| 3,154,471 | 10/1964 | Radkowsky | 176/40 |
| 3,260,649 | 7/1966 | Jens et al. | 176/18 |
| 3,266,998 | 8/1966 | Greebler | 176/40 |
| 3,287,224 | 11/1966 | Loewenstein | 176/40 |
| 3,357,891 | 12/1967 | Wadmark | 176/54 |
| 3,362,882 | 1/1968 | Sufer et al. | 176/40 |

*Primary Examiner*—Reuben Epstein
*Attorney*—Alfons Puishes

[57] ABSTRACT

A fast neutron fission chain reactor utilizes plutonium enriched in the isotope plutonium 240 as its principal fuel. A novel reactor concept employs a core comprising a critical mass of the subject isotope in combination with other isotopes, together with specially adapted control, safety, and related devices.

2 Claims, 7 Drawing Figures

INVENTOR.
Thomas J. Connolly
BY
Attorney

INVENTOR.
Thomas J. Connolly
BY
Attorney

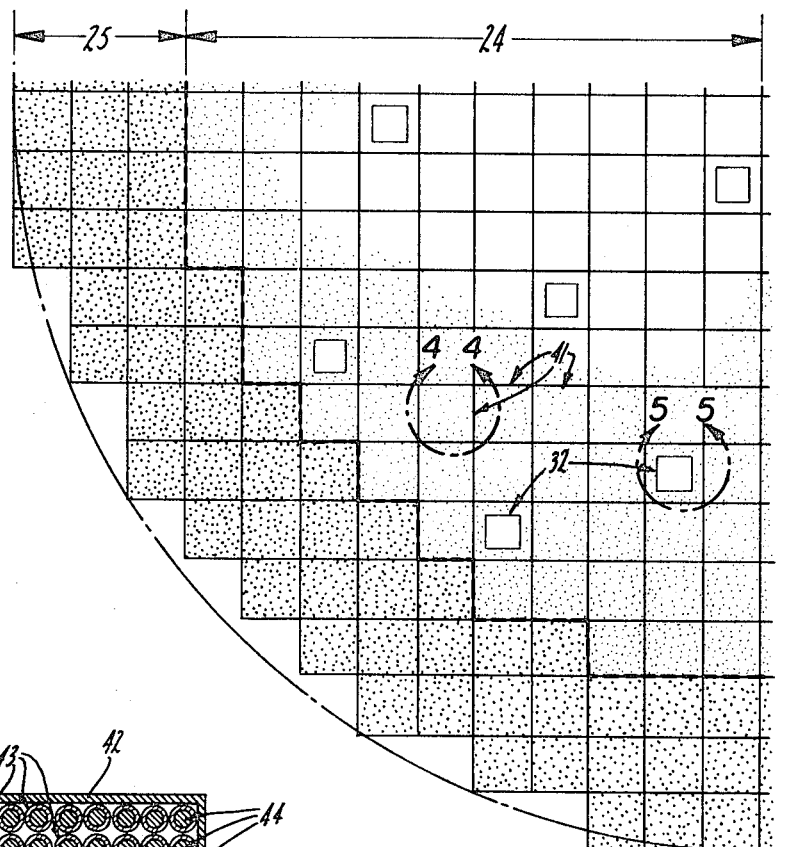
Fig. 3
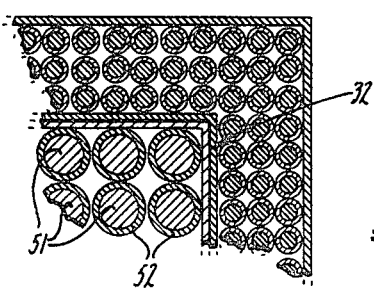
Fig. 4
Fig. 5

INVENTOR.
Thomas J. Connolly

FAST NEUTRONIC REACTOR UTILIZING PLUTONIUM 240 FUEL

BACKGROUND OF THE INVENTION

It is well recognized that certain isotopes of uranium and plutonium possess nuclear properties which make possible the construction of fission chain reactors using these materials as fuel. The fission chain reactor based on fissions by slow neutrons is described and claimed in the Fermi and Szilard application leading to U.S. Pat. No. 2,708,656. A neutronic reactor based on fissions caused by fast neutrons is described by Snell in the application for U.S. Pat. No. 2,815,319. The possibilities of both thermal or slow neutron reactors and fast neutron reactors for the generation of power and for irradiation of materials has been recognized and, in many cases, realized.

Slow or thermal neutrons in the present context refers to neutrons originating in the fission reaction which have undergone scattering collisions in which a considerable amount of their original energy or speed has been lost. Materials which effect this neutron slowing-down process efficiently are called moderators. A typical energy range for slow neutrons is 0.025 to 0.1 electron volts. Fast neutrons, on the other hand, are those neutrons originating in the fission reaction which have lost relatively little of their original energy. Neutrons emerging from the fission reaction have an average energy of 2,000,000 electron volts. A typical median energy for fast neutrons might be 200,000 electron volts.

A characteristic difference between fast and slow neutrons is that in typical fissionable isotopes (e.g., $^{233}U$, $^{235}U$, $^{239}Pu$), the interaction probability or cross section is much lower for fast neutrons. The result is that fast reactors require a higher concentration and quantity of fissionable material than do thermal reactors. This difference is well illustrated in the application of Snell for U.S. Pat. No. 2,815,319 for a fast neutronic reactor and of Christy, et al., U.S. Pat. No. 2,806,819) for a light water neutronic reactor (i.e., a thermal reactor). A claim in Snell's application cites a fast reactor containing 920 metric tons of uranium metal with a $^{235}U$ content of at least 7.63 percent (i.e., 70 metric tons of $^{235}U$). Cristy's application cites a thermal reactor containing 9.20 tons of uranium enriched to 0.89 percent $^{235}U$ (i.e., 0.09 tons of $^{235}U$).

The isotopes most commonly considered as the primary fissioning materials in fast or thermal reactors are $^{233}U$, $^{235}U$, and $^{239}Pu$. It is well recognized that other isotopes, such as $^{232}Th$ $^{238}U$, and $^{240}Pu$, do fission, but their fission cross sections are much lower than those of the aforementioned isotopes. Indeed, the isotopes $^{232}Th$ and $^{238}U$ will not by themselves sustain a chain reaction. The properties of the so-called fissile isotopes, $^{233}U$, $^{235}U$, $^{239}Pu$, and also $^{241}Pu$, create a serious safety problem when one or more of these isotopes is the primary fissioning isotope in a fast reactor. It has been noted that the concentration of these materials in a fast reactor is much higher than in a thermal reactor. Consequently, if a fast reactor core should in some unforeseen manner become mixed with a moderating material, the resulting mixture of materials would tend to behave more like a thermal reactor which requires far less fuel for criticality. The result would be a condition of supercriticality with a possible uncontrolled rise in power. This hazard is well recognized. Most fast reactor studies give a great deal of attention to hazards of this sort. (See, for example, M. J. McNelly, "Liquid Metal Fast Breeder Design Study", GEAP-4418, 1964).

The isotope $^{240}Pu$ is one of a series of plutonium isotopes which are produced in reactors. The most abundant of these is $^{239}Pu$ produced by neutron capture in $^{238}U$.

$$^{238}U + n \rightarrow {}^{239}U \rightarrow \beta^- + {}^{239}Np \rightarrow {}^{239}Pu + \beta^-$$

This is a so-called conversion reaction. $^{239}Pu$, when it reacts with a neutron, may either fission or form $^{240}Pu$, $$^{239}Pu + n \rightarrow {}^{240}Pu$$

The relative probability of $^{239}Pu$ for fission or $^{240}Pu$ formation depends on the energy of the reacting neutron. The formation of plutonium isotopes continues with the capture of a neutron in $^{240}Pu$, $$^{240}Pu + n \rightarrow {}^{241}Pu$$

$^{240}Pu$ also fissions, but the probability of fission with thermal neutrons is very slight. $^{241}Pu$, on the other hand, is fissile material which has a high thermal-neutron fission cross section. When, instead of fissioning, $^{241}Pu$ captures a neutron, $^{242}Pu$ is formed, $$^{241}Pu + n \rightarrow {}^{242}Pu$$

$^{242}Pu$ resembles $^{240}Pu$ in its fission cross section characteristics. It primarily captures neutrons to form $^{243}Pu$, which undergoes radioactive decay very rapidly and, therefore, is not a significant isotope in reactors.

Because of this formation of a whole series of plutonium isotopes in a reactor, starting with the formation of $^{239}Pu$ from $^{238}U$, the plutonium which is formed in uranium in either a thermal or a fast reactor is a mixture of isotopes. The exact composition depends on the neutron spectrum of the reactor, the power of the reactor, and the length of time the uranium is in the reactor. It is not possible to quote a single isotopic composition for reactor-produced plutonium, therefore.

The following compositions are given (L.E. Link, G.J. Fischer, E.L. Zebroski, "Fuel Cycle Economics of Fast Reactors", Proceedings of the Third International Conference on the Peaceful Uses of Atomic Energy, Vol. 11, 67–76 (1964) as typical starting plutonium compositions for fast reactors.

TABLE I

| Source | $^{239}Pu$ | $^{240}Pu$ | $^{241}Pu$ | $^{242}Pu$ |
|---|---|---|---|---|
| Thermal reactor | 55.5 | 29.4 | 11.3 | 3.8 |
| Fast Blanket | 92.1 | 7.5 | 0.4 | <0.1 |
| Fast core | 64.1 | 29.5 | 5.0 | 1.4 |
| Mixed core and blanket | 71.5 | 23.5 | 3.8 | 1.2 |

While, therefore, it has been well recognized that $^{240}Pu$ is fissionable and will be present in the fuel of existing reactors, no practical use of it as a principal constituent of a commercial reactor fuel has been made.

SUMMARY

I have discovered that $^{240}Pu$, either in the pure form or as a chemical compound, may form the basic fuel for a commercially successful fast neutronic reactor.

I have discovered further that a particular enrichment process disclosed herein below is especially suitable to the production of such a fuel.

I have discovered still further a reactor configuration which not only provides a critical mass and successful chain reaction, but also provides for proper control of the reaction and for safety of the reactor required for successful commercial operation.

My invention relates to the deliberate use of the isotope $^{240}Pu$ as a primary fissioning isotope in fast reactors. Because its nuclear properties differ so markedly from those isotopes which can be fissioned by thermal neutrons, much of the potential hazard associated with fast reactors will be obviated. At the same time, $^{240}Pu$, either along or in combination with other fissionable isotopes, can sustain a fission chain reaction, provided that the neutrons are of high enough energy, i.e., $^{240}Pu$ can sustain a chain reaction in a fast reactor but not in a thermal reactor.

It should now be clear that plutonium fuel for fast reactors could well be a mixture of isotopes. The presence of $^{240}Pu$ in a fuel material in a reactor is not new, basically. Rather, it is unavoidable. An important feature of my invention is the use of plutonium in which the concentration of $^{240}Pu$ is increased to the point where the characteristics of the resulting fast reactor are changed markedly from otherwise similar reactors fueled with plutonium of the isotopic compositions represented in Table I.

The Fermi application of Oct. 11, 1945, Ser. No. 621,838 (resulting in U.S. Pat. No. 2,807,581) instructs in the significance of the infinite multiplication factor $K$, as a criterion of the ability of a material or a mixture of materials to sustain a fission chain reaction. $K$ is defined as the ratio of the number of neutrons produced after one generation to the initial number for a system of infinite size. The value of $K$ must be greater than 1.0 for a chain reaction to be possible. The following table gives $K$ values which will prove instructive.

TABLE II

| Material | Inf. Mult. Factor K | Classification of Neutron Spectrum |
|---|---|---|
| $^{238}UO_2$ | 0.26 | Fast |
| $^{239}PuO_2$ | 2.84 | Fast |
| $^{240}PuO_2$ | 1.75 | Fast |
| $^{238}UO_2/H_2O$ 1:370 | ≈0 | Thermal |
| $^{239}PuO_2/H_2O$ 1:370 | 1.60 | Thermal |
| $^{240}PuO_2/H_2O$ 1:370 | ≈0 | Thermal |

From this table, it can be seen that while pure $^{239}PuO_2$ and $^{240}PuO_2$ can sustain a chain reaction, $^{240}PuO_2$ will not when mixed with a moderating material such as $H_2O$. The $PuO_2/H_2O$ molar ratio of 1:370 was obtained from H. C. Paxton, J. T. Thomas, Dixon Callihan, E. B. Johnson, "Critical Dimensions of Systems Containing $^{235}U$, $^{239}Pu$, and $^{233}U$," TID-7028 (1964), being the ratio that achieves a near-minimum critical mass. $^{238}UO_2$ can not sustain a chain reaction either alone or in admixture with a moderating material.

DESCRIPTION OF THE DRAWINGS

FIG. 3 is a sectional diagramatic sketch of a quadrant of the core and blanket of a power reactor shown in FIG. 2.

FIG. 4 is a cross-sectional view of a fuel or core element in the power reactor of FIG. 2.

FIG. 5 is a cross-sectional view of a control element in the power reactor of FIG. 2.

DESCRIPTION OF PREFERRED EMBODIMENTS

It is known to those skilled in the art that a practicable power or materials testing reactor is comprised of much more than pure fissionable material. Some materials are included for structural purposes; others are required for removal of the fission heat; others, such as $^{232}Th$ or $^{238}U$ are included to promote the conversion process which increases the supply of fissile material; some, such as $^{240}Pu$ in plutonium, are included because there is no simple way of eliminating them when their element is used. In short, the test of a material as a practicable reactor fuel is whether it can sustain a chain reaction in an assembly of materials which meet the requirements of the reactor.

Figure 1:
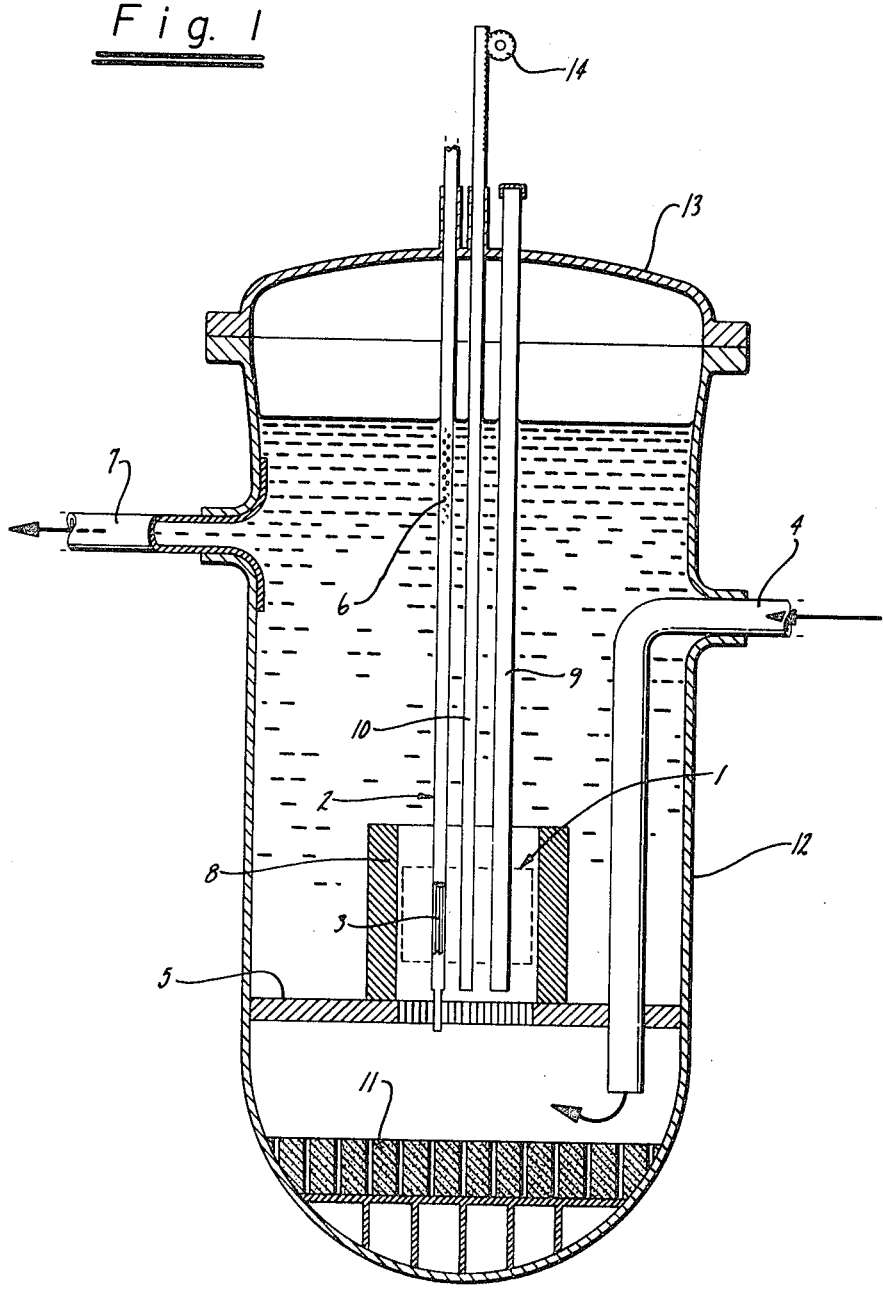
FIG. 1 is a sectional elevation of a preferred embodiment of a test reactor using 240-enriched plutonium fuel.

FIG. 1 shows a possible construction of a fast test reactor fueled with 240-enriched plutonium. The core region 1 is roughly in the shape of a right cylinder formed by approximately 45 fuel elements 2 which extend through the top of the reactor vessel. The diameter of the core is 40 inches; its height, which is determined by the segment of the fuel element 2 which contains plutonium-loaded rods 3, is about 40 inches. The core volume is 800 liters.

The fuel elements 2 consist of an assembly of approximately 200 fuel rods or pins 3 having an outside diameter of one-fourth inch. These fuel rods consist of an outer cladding of stainless steel and an inner core of a mixture of uranium carbide and plutonium carbide. The details of the fuel composition are given in Table III.

TABLE III

Core Composition of Test Reactor

| | Core vol. % | Fuel atomic % | Mass in Core kg. |
|---|---|---|---|
| Fuel | 30.0 | | |
| $^{238}UC$ | | 65 | 1908 |
| $^{239}PuC$ | | 14 | 413 |
| $^{240}PuC$ | | 21 | 622 |
| Sodium Coolant | 45.0 | | 294 |
| Structural Material | 25.0 | | 1529 |

The 200 or so fuel rods are held together as a bundle inside the fuel element wall, which is hexagonal in shape and measures about 4.5 inches across the flats. The individual rods are separated by wires or other spacers to provide adequate distribution of the sodium coolant. Nominally, 45 such fuel elements 2 are used in the core, although there are positions for several more, which may be used according to experimental needs.

Fission heat is removed from the reactor core by liquid sodium. The sodium returns from the heat-removal system (not shown) at a temperature of 500° F. and is pumped through inlet pipe 4 below the lower grid plate 5 of the reactor. It then flows up through the fuel elements and, to a lesser extent, through the reflector 8. The sodium is heated to about 900° F. in flowing over the fuel rods, and emerges through holes 6 located in the fuel element tube below the surface level of the sodium in the reactor vessel. It then flows through duct 7 to the heat-removal system. At the design power of 400 megawatts thermal, the flow rate of the sodium is 1,100,000 pounds per hour.

The reactor core is reflected on the sides by stationary elements 8 of stainless steel or other suitable metal which are cooled by sodium flow. It is reflected on the top and bottom by stainless steel rods which have dimensions similar to the fuel rods and are simple extensions of the fuel rods. The reflector region is about 12 inches thick.

Since this reactor is designed for testing purposes, provision must be made for insertion of materials and objects to be tested. This function is accomplished by tubes 9 extending through the reactor vessel top into the core. Control of the reactor is effected by six rods of beryllium oxide 10 extending into the core. One of the advantages of 240-enriched plutonium fuel is that the reactor reactivity is negatively affected by a moderating (as opposed to a neutron absorbing) material. In the reactor of FIG. 1, it is estimated that the insertion of all six beryllium oxide control elements would reduce the multiplication by 1.12 percent. If the worth of the beryllium oxide rods proves insufficient for the required reactivity changes, some neutron absorbing material such as boron can be used either alone or in admixture with the beryllium oxide. Alternatively, a more strongly moderating material such as zirconium hydride could be used in place of beryllium oxide.

Below the core an arrangement of moderating material 11, such as graphite, is placed so that in the event of a meltdown accident, the falling fuel material will be moderated and rendered subcritical due to the very negative reactivity of $^{240}Pu$ in a moderated neutron field.

The vessel 12 is equipped with a removable head 13, and since this may be of a conventional type, details are not shown. Fuel elements 2, experimental tubes 9, and control rods 10 extend through head 13 through suitable stuffing boxes also not shown. Control rod drive 14 may also be of a conventional construction mounted above head 13.

Figure 2:
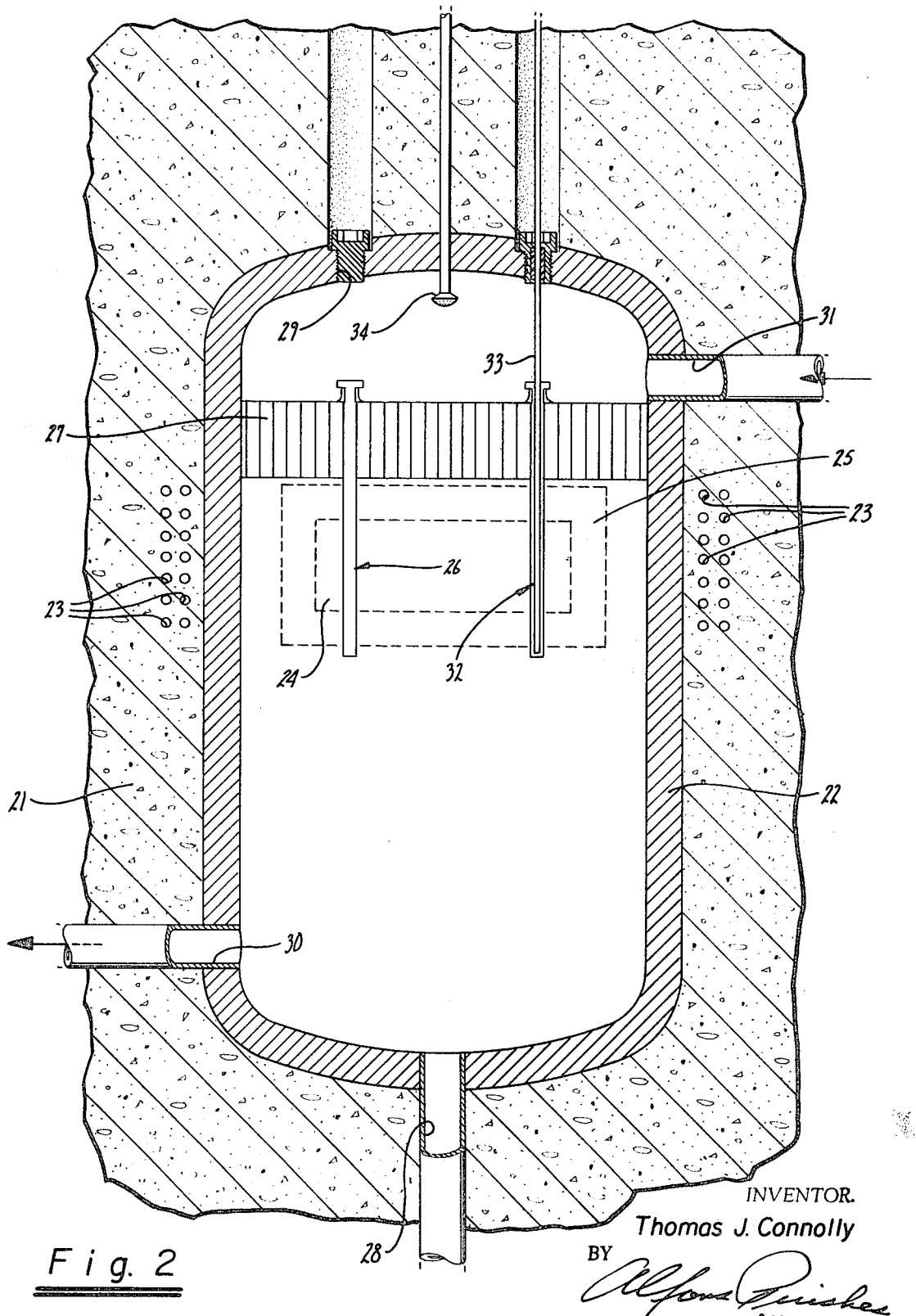
FIG. 2 is a sectional elevation of a preferred embodiment of a power reactor using 240-enriched plutonium fuel.

Another embodiment of my invention is a gas-cooled power reactor. Such a reactor is shown in FIG. 2. Because the gas coolant must be maintained at a high pressure in order for it to possess the heat-transport properties necessary for economic heat generation rates in the reactor, the entire reactor is enclosed in a prestressed concrete vessel 21, lined with a gastight stainless steel liner 22. Adequate provision must be made to maintain the concrete below about 150° F. in order to prevent deterioration. Cooling is effected by flowing water through tubes 23 embedded in the concrete.

The reactor core 24 and blanket 25 (or reflector) are outlined in FIG. 2 by dotted lines. The core and blanket are roughly in the shape of concentric right cylinders. They are formed by the suspension of square cross section fuel elements 26 from the grid plate 27 in a closely packed array. A sectional sketch of a quadrant of the core 24 and blanket 25 is shown in FIG. 3. Provision is made for the introduction into and the removal from the reactor vessel of fuel elements and blanket elements through opening 28. Each element 26 is secured to the grid plate 27 by a tool extending through openings 29 of the reactor vessel (not shown).

A core element 41 consists of a stainless steel box 42 approximately 6 inches square (see FIG. 4). Inside the box, positioned in a square 14 × 14 array, are 196 fuel rods 43. These rods are composed of pellets 44 made from a mixture of plutonium carbide and uranium carbide. The pellets are about 0.3 inches in diameter and are encased in a stainless steel cladding tube 45 approximately 0.015 inches thick. The pellets are stacked to a height of about 55 inches, which is the height of the core. Above and below the core pellets are pellets of $^{238}$UC stacked for a distance of about 18 inches; these form the axial blanket or reflector. As indicated in FIG. 3, there are about 316 of the core elements and, outside of these, are arranged an additional 208 blanket elements, similar to the core elements except that the rods contain only $^{238}$UC and the rods are of larger diameter since the heat-generation rate is less. These elements comprise the radial blanket.

In this case the coolant is carbon dioxide ($CO_2$), which is heated at a pressure of about 2,000 lb per sq inch while flowing downward through the reactor core to a temperature of about 1,100° F. The $CO_2$ then flows through a passage 30 to a steam generator in which the steam to drive a turbine system is produced while the $CO_2$ is cooled to about 600° F. It is then returned to the top of the core through duct 31, thus completing the coolant cycle. The reactor described here is designed to yield 2,650 megawatts of thermal energy; the associated steam-electric generating plant would yield 1,000 megawatts of electricity.

Additional detail concerning the composition of the core is given in the following table.

TABLE IV

Composition of Gas-Cooled Power Reactor

|  | Vol. % | Atomic % | Mass kg |
|---|---|---|---|
| CORE |  |  |  |
| Fuel | 35 |  |  |
| $^{238}$UC |  | 80 | 32,900 |
| $^{239}$PuC |  | 8 | 3,300 |
| $^{240}$PuC |  | 12 | 4,970 |
| Carbon dioxide | 50 |  | 780 |
| Structural material | 15 |  | 11,560 |
| BLANKET |  |  |  |
| Uranium | 50 |  |  |
| $^{238}$UC |  | 100 | 93,000 |
| Carbon dioxide | 35 |  | 540 |
| Structural material | 15 |  | 17,900 |

Control of this reactor is effected by control elements of beryllium oxide 32 which move up and down inside some of the fuel elements. FIG. 5 shows a cross section of such a control element in which the center contains beryllium oxide rods 51 encased in stainless steel 52. The motion of the control element is accomplished by a suitably sealed shaft 33 extending through the reactor enclosure 21. About 35 of the 315 core fuel elements contain control elements. The insertion of the total beryllium oxide in these elements results in a negative 2.5 percent effect on the reactor multiplication. If desired, additional negative effect can be accomplished either by increasing the number of control elements, increasing the moderation effect of the control elements by inclusion of such materials as zirconium hydride, or by the inclusion of a neutron-absorbing material such as boron or boron-10.

Also shown in FIG. 2 is a steam spray nozzle 34 through which steam and/or water may be admitted in the case of failure of the regular cooling system. The nature of the 240-enriched plutonium fuel is such that admission of water or steam suppresses reactivity.

Figure 6:
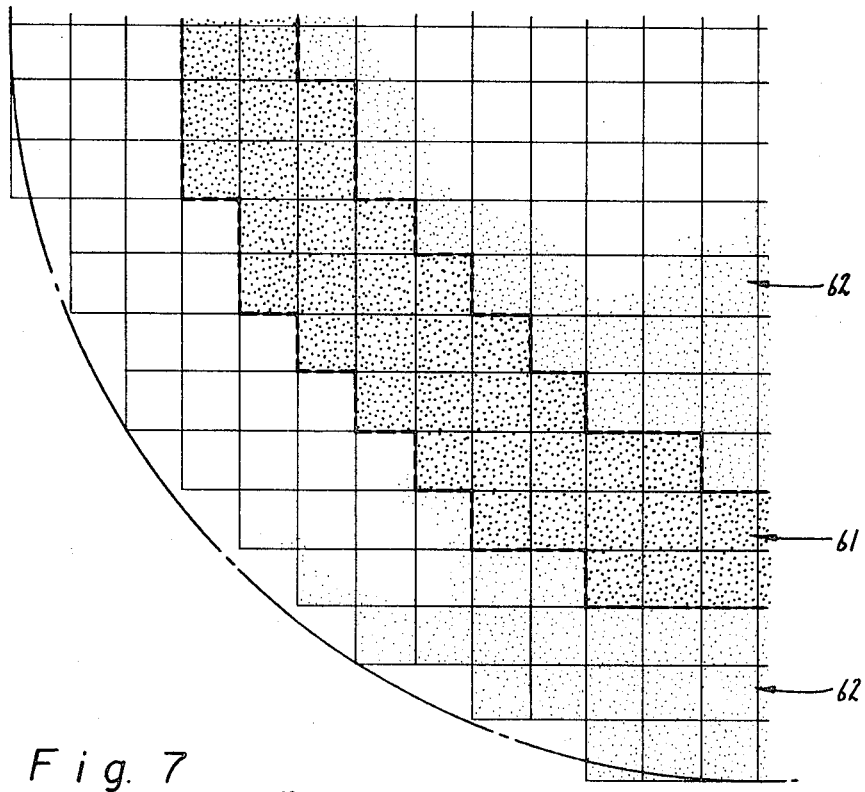
FIG. 6 is a sectional diagramatic sketch of a quadrant of the core of the power reactor shown in FIG. 2 with an alternate loading comprising a seed and blanket.

An alternative loading scheme for a fast reactor fueled with 240-enriched plutonium is the so-called seed and blanket scheme which has been used in light-water-moderated thermal reactors (J. W. Simpson, et al., "Description of the Pressurized Water Reactor Power Plant at Shippingport, Pa". Proc. of the International Conference on Peaceful Uses of Atomic Energy, Vol. 3, 211–242 (1955)). One such loading pattern after the manner of my invention is shown in FIG. 6. The "seed" fuel 61 consists of 30 percent plutonium carbide and 70% $^{238}$UC, in which the plutonium is 60% $^{240}$Pu and 40% $^{239}$Pu. The "blanket" fuel 62 is 94% $^{238}$UC, 5% $^{239}$PuC, and 1% $^{240}$PuC. The objective in using a combination of fuels like this is to achieve the favorable characteristics of a 240-enriched plutonium fuel while minimizing the actual consumption of $^{240}$Pu. It is desirable to minimize $^{240}$Pu consumption because it promises to limit the rate at which 240-enriched plutonium can be used on a large scale as fast reactor fuel. In the blanket fuel proposed here, there is a net production of $^{240}$Pu. Otherwise the reactor, its fuel elements and control elements are as described in FIGS. 2 to 4. The compositions of seed and blanket are given in the following table.

TABLE V

Composition of Seed and Blanket Fast Reactor

|  | Core Vol. % | Vol. % | Atomic % | Mass kg |
|---|---|---|---|---|
| SEED | 28 |  |  |  |
| Fuel |  | 35 |  |  |
| $^{238}$UC |  |  | 70 | 14,300 |
| $^{239}$PuC |  |  | 12 | 2,570 |
| $^{240}$PuC |  |  | 18 | 3,710 |
| Carbon dioxide |  | 50 |  | 640 |
| Structural Material |  | 15 |  | 4,600 |
| BLANKET | 72 |  |  |  |
| Fuel |  | 35 |  |  |
| $^{238}$UC |  |  | 94 | 56,000 |
| $^{239}$PuC |  |  | 5 | 3,000 |
| $^{240}$PuC |  |  | 1 | 600 |
| Carbon dioxide |  | 50 |  |  |
| Structural Material |  | 15 |  |  |

The concepts outlined here are not restricted to any particular core design or component. The concept is valid for a variety of fast reactor core designs involving different coolants, fuel elements, or control elements. It is applicable to homogeneous as well as heterogeneous reactors. The core configuration and fuel composition which is used in any particular case of a test or a power reactor represents the resultant of many safety and economic considerations.

The essential feature of all of these embodiments of my invention is that the element plutonium is used in the fuel and that in this plutonium the isotope $^{240}$Pu is in high enough concentration that the introduction of a purely moderating material in any quantity to the core does not result in a positive reactivity effect.

The relative atomic percentage of the isotopes $^{239}$Pu and $^{240}$Pu disclosed in the embodiments herein represent satisfactory values for good reactor operation. The important thing is the atomic percent of $^{240}$Pu in the element Pu. I have discovered that this may vary from a value of 50 percent up to 100% $^{240}$Pu, though, of course, the latter is not economically feasible. In the embodiments shown I have used an atomic percent of 60 $^{240}$Pu. I have also shown the compounds PuC and UC, but other compounds of these elements such as oxides are known to work satisfactorily also.

The advantages of 240-enriched plutonium as a fast reactor fuel should now be evident in many ways. Some of these are:
1. The value of $^{240}$Pu and $^{242}$Pu, isotopes which will be produced in many reactors, will be enhanced without decreasing the value of the fissile isotopes, $^{239}$Pu and $^{241}$Pu. (Note: in the various discussions here, $^{241}$Pu and $^{242}$Pu have been largely ignored. These two isotopes very much resemble $^{239}$Pu and $^{240}$Pu, respectively. They are inherently less abundant. Therefore, the treatment has been simplified by omitting many possible references to them. For the most part, $^{239}$Pu and $^{241}$Pu can be treated as one isotope and $^{240}$Pu and $^{242}$Pu as another.)
2. In a fast reactor fueled with 240-enriched plutonium, it is possible to rely on moderating materials for control. Moderating materials such as $H_2O$, $D_2O$, zirconium hydride, beryllium, and beryllium oxide, will lower the energy of the average neutron, thus introducing a negative effect on the multiplication constant.
3. In the neutron energy region in which the Doppler effect operates, the resonances will be predominantly capture (as opposed to fission) so that the Doppler effect would make a negative contribution to the multiplication constant. The Doppler effect is considered an important phenomenon in fast reactor control and safety.
4. In the processing of 240-enriched plutonium fuel, both before insertion in the reactor and after discharge, the criticality problems will be much less severe than with normal reactor-produced plutonium, thus offering the possibility of less costly processing.
5. Water emergency cooling can be used since the resulting moderation will not result in a supercritical medium. Likewise, fuel handling can be performed under water, if that is desired.
6. A moderating material such as graphite or light water can be placed under a reactor core so that in the case of a meltdown accident the falling fuel material will be rendered subcritical.

It is known that the plutonium which will be produced in uranium-fueled reactors, thermal or fast, will have a $^{240}$Pu content below that required to implement this invention. There is a problem, therefore, of enriching plutonium in the isotope $^{240}$Pu. Two possible ways of effecting this enrichment are considered here. The first is isotopic separation in the manner that uranium is or can be enriched in the isotope $^{235}$U. The method predominantly employed in the United States is the gaseous diffusion process. Although the separation factor between $^{239}$Pu and $^{240}$Pu would be less than that between $^{235}$U and $^{238}$U, the composition of the feed and the required degree of enrichment would require much less separative work ("AEC Gaseous Diffusion Plant Operations," ORO-658, 1968) than in the case of, say, the production of 93% $^{235}$U from natural uranium containing 0.71% $^{235}$U. The cost of a unit separative work for the plutonium separation would undoubtedly be much higher, however.

Figure 7:
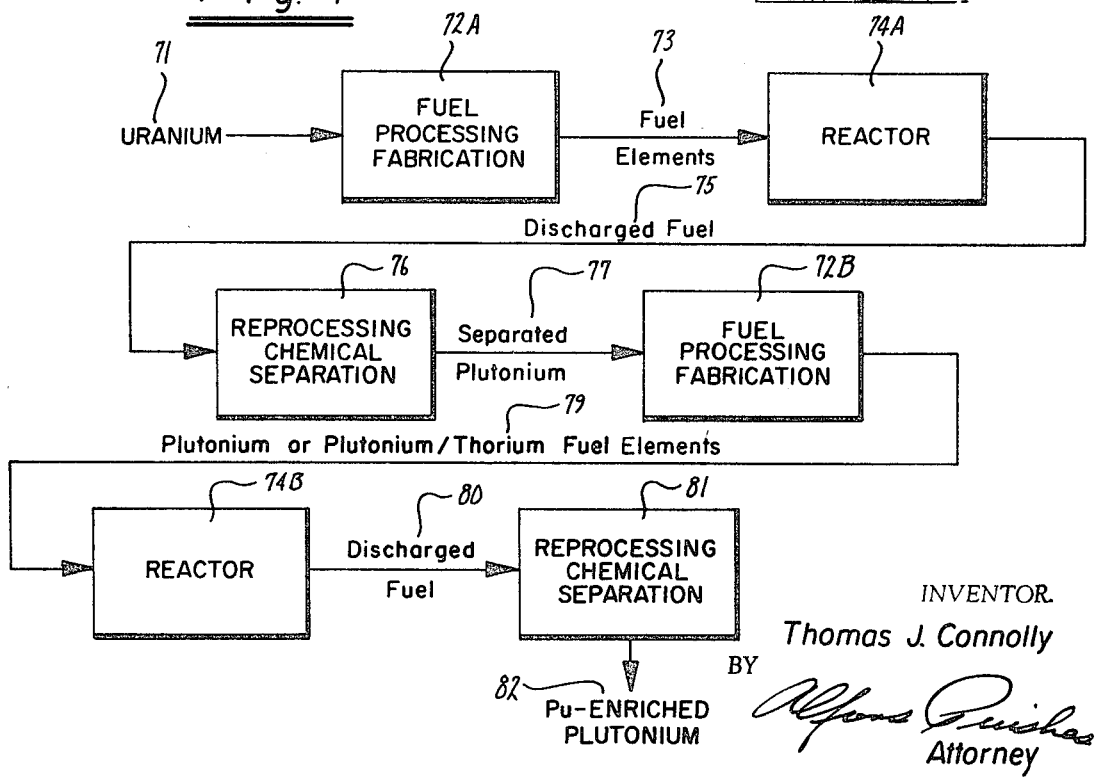
FIG. 7 is a flow diagram showing a preferred method of enrichment of plutonium in the isotope $^{240}Pu$ for use in my invention.

I have discovered a more practicable scheme for effecting the enrichment of plutonium in the isotope $^{240}$Pu, which may be achieved simply by using reactor-grade plutonium as fuel in certain reactors under certain conditions. A process scheme for accomplishing this concentration of $^{240}$Pu is shown in FIG. 7.

Uranium 71, either natural, depleted or enriched, is processed and fabricated 72A into fuel elements 73 for a reactor 74A, which may be either thermal or fast. The fuel elements 73 may also contain plutonium. After reaching some irradiation or burnup, according to the operating plan of reactor 74A, the fuel elements 73 are discharged 75 from the reactor and moved to reprocessing operations 76 in which the elements uranium and plutonium are separated from various impurities, such as fission products, and from each other. The resulting separated plutonium 77 then goes to processing and fabrication 72B into fuel elements 79. Examples of the isotopic composition of the plutonium 79 at this point are given in Table I. This processing plate 72B may be the same as or different from plant 72A. If it is desirable, the plutonium 77 may be combined with such fuel materials as $^{232}$Th, $^{233}$U, or $^{235}$U 78. These materials, in capturing neutrons, do not form plutonium isotopes. The important point is that the plutonium is not recombined with $^{238}$U. If the plutonium 77 was recombined with $^{238}$U, then the continued formation of $^{239}$Pu by the neutron irradiation would prevent the enrichment of plutonium in the isotope $^{240}$Pu. The plutonium fuel elements 79 than are inserted in reactor 74B, which may be the same reactor as 74A, or may be different. In order to achieve the desired $^{240}$Pu enrichment, it is necessary that reactor 74B have certain neutron spectral characteristics, which will be discussed later. It is entirely permissible that fuel containing $^{238}$U be used in reactor 74B; it is only necessary that the plutonium fuel 79 be capable of being mechanically separated from any $^{238}$U-containing fuel following irradiation in reactor 74B. Following irradiation of plutonium fuel 79 in reactor 74B the plutonium, which is enriched in the isotope $^{240}$Pu, is discharged 80 and recovered in reprocessing plant 81. The $^{240}$Pu-enriched plutonium 82 is then available for use as a fast-reactor fuel in the implementation of the present invention as disclosed above.

An analysis of the degree of enrichment of the isotope $^{240}$Pu which can be achieved will now be made. When the element plutonium is isolated from $^{238}$U and irradiated, the variation in composition may be represented as follows:

$$\frac{N_{239}(\tau)}{N_{239}(0)} = e^{-\sigma_{239}\tau}$$

$$\frac{N_{240}(\tau)}{N_{239}(0)} = \frac{(\sigma^c_{239}/\sigma_{239})}{1-(\sigma_{240}/\sigma_{239})}\left[e^{-\sigma_{240}\tau} - e^{-\sigma_{239}\tau}\right] + \frac{N_{240}(0)}{N_{239}(0)}e^{-\sigma_{240}\tau}$$

There are similar expression for $N_{241}(\tau)$ and $N_{242}(\tau)$. The quantity $\tau$ expresses the degree of irradiation. The $\sigma$ values represent a set of one-group effective cross sections, expressing the rate of neutron reaction per nucleus. The solution of this set of equations gives the variation in isotopic composition of plutonium as it is irradiated. Examples are given in Table VI. The extent of irradiation is expressed in terms of the percent of original plutonium remaining.

TABLE VI

The Change in Composition of Plutonium with Irradiation

| | Pu Composition (atomic %) % Original Pu Remaining | | |
|---|---|---|---|
| Isotope | 100% | 64% | 45% |
| $^{239}$Pu | 72.0 | 41.4 | 21.4 |
| $^{240}$Pu | 20.0 | 37.8 | 42.1 |
| $^{241}$Pu | 7.0 | 15.5 | 22.6 |
| $^{242}$Pu | 1.0 | 5.3 | 13.9 |

It is clear from these values that the concentration of $^{240}$Pu (and $^{242}$Pu) increases relative to the fissile isotopes, $^{239}$Pu and $^{241}$Pu. It should be emphasized that the plutonium which disappears, when processed in the scheme of FIG. 7, is not wasted, but contributes through fission to the energy generated in reactor 74B. The irradiation of segregated plutonium can take place in either a thermal or a fast reactor. The important parameters for $^{240}$Pu enrichment are the values of $\sigma_{239}^c$ and $\sigma_{240}$ relative to $\sigma_{239}$. The enrichment of $^{240}$Pu is enhanced by a low value of $\sigma_{240}$. Because $^{240}$Pu has a very high cross section for epithermal neutrons, it is desirable that if reactor 74B of FIG. 7 is a thermal reactor, the flux be as soft or well thermalized as possible. The effective epithermal cross section of $^{240}$Pu can also be decreased by lumping or concentrating the plutonium to promote resonance self-shielding.

It should now be clear to those skilled in the art that I am able to produce plutonium enriched in the isotope $^{240}$Pu to the extent necessary for its successful use as a primary fissioning isotope in a fast reactor and that I am able to build and operate such a reactor which has many advantages over existing fast reactors as set forth above.

I claim:
1. A fast neutronic reactor comprising:
 a pressure vessel;
 a core positioned within said vessel, said core comprising
  a first blanket section;
  a seed section surrounding said first blanket section;
  a second blanket section surrounding said seed section;
  a plurality of fuel elements positioned within said blanket and said seed sections;
 a coolant disposed to remove heat from said core;
 control means for said reactor;
 said blanket fuel elements containing a fuel comprising $^{238}$U in the range of 94 to 99 atomic percent, $^{239}$Pu in the range of 1 to 5 atomic percent, and $^{240}$Pu in the range of 0 to 1 atomic percent;
 said seed fuel elements containing a fuel comprising Pu having an isotopic composition in the range from 50 atomic percent $^{240}$Pu to 100 atomic percent $^{240}$Pu;
 whereby said fuel, said elements, said core, said seed, said blanket, said coolant and said control means are disposed to maintain a self-sustaining fast fission chain reaction within said pressure vessel.

2. The reactor of claim 1 in which said seed fuel comprises a compound of Pu having an isotopic composition in the range of from 50 atomic percent $^{240}$Pu to 100 atomic percent $^{240}$Pu, and said blanket fuel comprises a compound of $^{238}$U.

* * * * *